(12) United States Patent
Kamihara

(10) Patent No.: US 7,931,994 B2
(45) Date of Patent: Apr. 26, 2011

(54) FUEL CELL SYSTEM WITH RECIRCULATION SYSTEM AND PURGE VALVE

(75) Inventor: Tetsuya Kamihara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 915 days.

(21) Appl. No.: 10/519,473

(22) PCT Filed: Dec. 3, 2003

(86) PCT No.: PCT/JP03/15455
§ 371 (c)(1), (2), (4) Date: Dec. 29, 2004

(87) PCT Pub. No.: WO2004/051780
PCT Pub. Date: Jun. 17, 2004

(65) Prior Publication Data
US 2005/0244686 A1    Nov. 3, 2005

(30) Foreign Application Priority Data
Dec. 3, 2002 (JP) .................. 2002-351274

(51) Int. Cl.
*H01M 8/04* (2006.01)

(52) U.S. Cl. ........................ 429/444; 429/431

(58) Field of Classification Search ............... 429/17, 429/34, 22, 13, 24, 25, 23
See application file for complete search history.

(56) References Cited

U.S. PATENT DOCUMENTS

| | | | | |
|---|---|---|---|---|
| 5,605,770 A | * | 2/1997 | Andreoli et al. | 429/20 |
| 6,063,515 A | * | 5/2000 | Epp et al. | 429/17 |
| 6,096,449 A | * | 8/2000 | Fuglevand et al. | 429/13 |
| 2001/0014415 A1 | * | 8/2001 | Iio et al. | 429/22 |
| 2002/0022167 A1 | | 2/2002 | Herron | |
| 2002/0094467 A1 | | 7/2002 | Nonobe et al. | |
| 2004/0161657 A1 | * | 8/2004 | Simpson et al. | 429/38 |

FOREIGN PATENT DOCUMENTS

| | | |
|---|---|---|
| CA | 2293898 | 7/2000 |
| EP | 1 018 774 A1 | 7/2000 |
| JP | 2001-266922 A | 9/2001 |
| JP | 2002151116 A * | 5/2002 |
| WO | WO 2004/049489 A2 | 6/2004 |

* cited by examiner

*Primary Examiner* — Dah-Wei D Yuan
*Assistant Examiner* — Stephan Essex
(74) *Attorney, Agent, or Firm* — Foley & Lardner LLP

(57) ABSTRACT

A fuel cell system which includes: a fuel cell (1); a supply system (Sc) for supplying fuel gas to the fuel cell (1); a recirculation system (Rc) for recirculating unused fuel gas from the fuel cell (1), in which the fuel gas therein may contain nitrogen; a purge valve (8) for purging nitrogen contained in the fuel gas in the recirculation system (Rc); and a controller (100) for adjusting a valve opening of the purge valve (8) so that a nitrogen concentration of the fuel gas in the recirculation system (Rc) is kept constant.

23 Claims, 4 Drawing Sheets

FUEL CELL SYSTEM WITH RECIRCULATION SYSTEM AND PURGE VALVE

TECHNICAL FIELD

The present invention relates to a fuel cell system, particularly to a fuel cell system having a closed loop fuel recirculation system for recirculating unused hydrogen from the fuel cell, in which nitrogen transported to the fuel recirculation system due to diffusion is efficiently discharged.

BACKGROUND ART

In Polymer Electrolyte Fuel Cell system using hydrogen gas as fuel for a fuel cell stack thereof, hydrogen gas unused at the fuel cell stack is returned to a supply line thereof to be recirculated in a closed loop fuel recirculation system. Recirculation of the hydrogen gas thereof provides a hydrogen supply to the fuel cell stack at a rate exceeding consumption rate thereof, stabilizing power generation by the fuel cell stack.

Japanese Patent Application Laid-Open No.2001-266922 discloses a fuel cell system in which unused hydrogen is recirculated by use of an ejector provided on a supply line to the fuel cell.

DISCLOSURE OF INVENTION

In the fuel cell system described above, when air is used as an oxidant, nitrogen contained in the air is transported due to diffusion from cathode flow channels through polymer electrolyte membranes to anode flow channels of the fuel cell stack, and a nitrogen concentration increases in the hydrogen gas of the fuel recirculation system.

When the nitrogen concentration in the hydrogen gas increases, a hydrogen partial pressure thereof is lowered, resulting in a drop in power generation efficiency of the fuel cell system. An amount of hydrogen recirculated through the ejector is also lowered, adversely affecting the maintenance of the stable power generation of the system.

Provision of a purge valve for purging the nitrogen in the fuel recirculation system, which is to be periodically opened to discharge the nitrogen containing hydrogen gas to the atmosphere, may be a measure for this problem. However, when the purge valve is opened, the hydrogen and the nitrogen in the hydrogen gas are discharged together. If the purge valve continues to be opened, the performance of the fuel cell system drops.

The present invention has been made in the light of the problems described above. It is an object of the present invention to improve performance of a fuel cell system, controlling an amount of hydrogen to be discharged out of a fuel recirculation system, while purging nitrogen transported to the fuel recirculation system due to diffusion.

An aspect of the present invention is a fuel cell system comprising: a fuel cell for generating power from fuel gas supplied thereto; a supply system for supplying fuel gas to the fuel cell; a recirculation system for recirculating unused fuel gas from the fuel cell, the fuel gas in the recirculation system containing nitrogen; a purge valve for purging nitrogen contained in the fuel gas in the recirculation system; and a controller for adjusting a valve opening of the purge valve so that a nitrogen concentration of the fuel gas in the recirculation system is kept constant.

BRIEF DESCRIPTION OF DRAWINGS

The invention will now be described with reference to the accompanying drawings wherein.

BEST MODE FOR CARRYING OUT THE INVENTION

Figure 1:
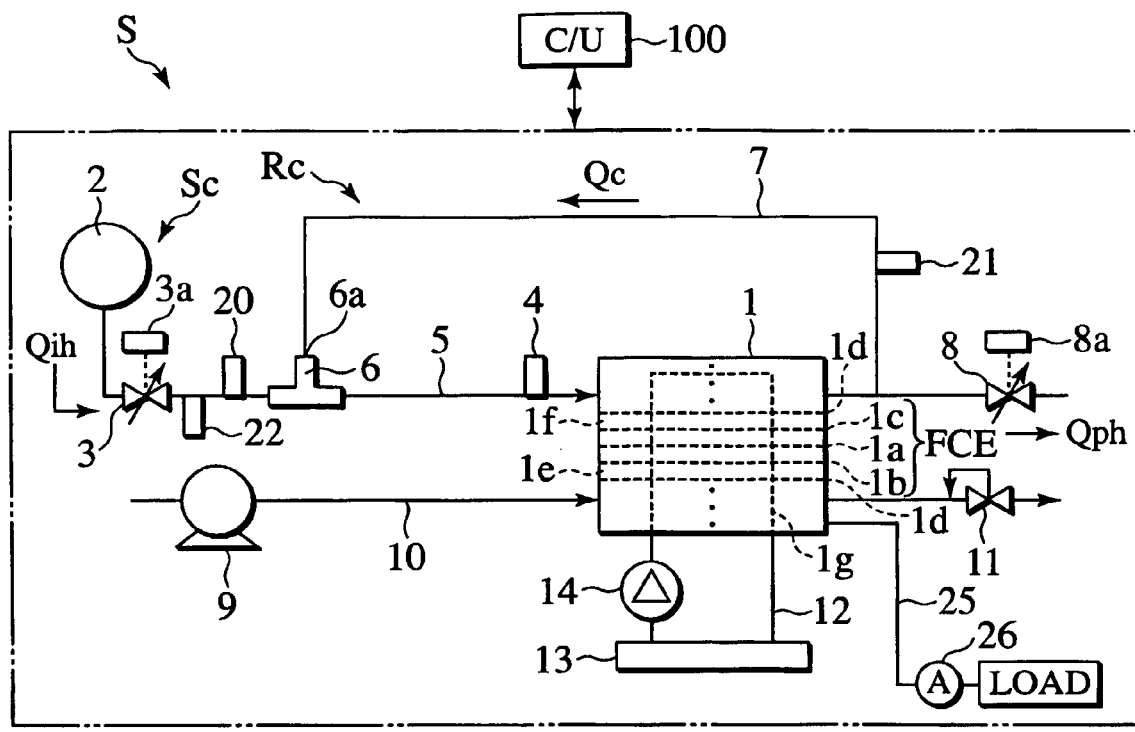
FIG. 1 is a system diagram illustrating a configuration of a fuel cell system according to a first embodiment of the present invention.

Embodiments of the present invention will be explained below with reference to the drawings, wherein like members are designated by like reference characters.

A fuel cell system S of a first embodiment illustrated in FIG. 1, includes a fuel cell stack 1 which generates electrical power from hydrogen fuel gas, a fuel tank 2 for storing the fuel gas, an ejector 6 which pumps the fuel gas for recirculating in the system, and a purge valve 8 which purges nitrogen contained in the fuel gas by discharging the fuel gas to the atmosphere together with the nitrogen.

In the fuel cell stack 1, cathode (as oxidant electrode, or air electrode) 1b and anode (as fuel electrode) 1c are provided so as to be parallel to each other with a polymer electrolyte membrane 1a interposed therebetween. These elements arranged in this manner collectively constitute a fuel cell element FCE. Each fuel cell element FCE is further sandwiched by a pair of separators 1d. The fuel cell stack 1 is constituted of a plurality of these sandwiched FCE stacked on each other. The fuel gas is introduced into anode flow channels 1f provided between the anode 1c and the separator 1d, and air as an oxidant is introduced into cathode flow channels 1e provided between the cathode 1b and the separator 1d.

The fuel gas is supplied from the fuel tank 2 to the fuel cell stack 1 via a variable throttle hydrogen pressure regulator 3, in which throttle opening thereof is detected by a sensor 3a. Pressure Ph2 of the fuel gas supplied to the fuel cell stack 1 is detected by a pressure sensor 4 and is controlled by a controller 100 to be kept within a proper range.

The ejector 6 is provided on a supply line 5 between the regulator 3 and the fuel cell stack 1. To a side-stream port 6a of the ejector 6, a return line 7 from the fuel cell stack 1 is connected. The ejector 6 withdraws unused fuel gas of the fuel cell stack 1 from the return line 7, and pumps it to an inlet of the fuel cell stack 1. The supply line 5, the ejector 6, the anode flow channels 1f of the fuel cell stack 1 and the return line 7 collectively constitute a fuel recirculation system Rc through which the fuel gas is circulated to thereby enhance electrochemical reaction efficiency in the fuel cell stack 1 and stabilize power generation thereof.

Nitrogen contained in the air is partially transported due to diffusion from the cathode flow channels 1e through the membranes 1a to the anode flow channels 1f, and is thereby introduced into the fuel recirculation system Rc. The purge valve 8 has therein a sensor 8a for detecting a valve opening degree Vo thereof, and, based on the detected valve opening degree Vo, the controller 100 controls valve opening thereof to maintain a concentration of nitrogen in the fuel recirculation system Rc within a proper range. A method for controlling the purge valve 8 will be described later.

Upstream of the ejector 6, there are provided a pressure sensor 20 to detect ejector inlet pressure Ph1 of the fuel gas and a temperature sensor 22 to detect ejector inlet temperature Th1. Moreover, on the fuel recirculation system Rc near the purge valve 8, there is provided a temperature sensor 21 to detect purge valve inlet temperature Th2 of the fuel gas. The detected purge valve inlet temperature Th2 is used for calculating a flow rate threshold to be described later for determining whether the valve opening degree Vo of the purge valve 8 should be increased or decreased.

An air system for supplying the oxidant air to the fuel cell stack 1 is constituted of a compressor 9, an air supply line 10, the cathode flow channels 1e of the fuel cell stack 1, and a variable throttle valve 11 serving as an air system pressure regulator. The air introduced to the system by the compressor 9 is supplied through the air supply line 10 to the cathode flow channels 1e of the fuel cell stack 1, where oxygen contained in the air diffuses into the cathode 1b, ionizes, and electrochemically reacts with hydrogen ions (protons) transported through the membrane 1a to form water. After flowing out of the cathode flow channels 1e of the fuel cell stack 1, the air is discharged together with the formed water outside of the air system through the variable throttle valve 11.

A cooling system is also provided for removing heat produced by electrical resistance and electrochemical reaction from the fuel cell stack 1, which is constituted of a coolant pump 14, a radiator 13, a coolant passage 1g provided in the fuel cell stack 1, a coolant line 12 which connects the stack 1, the coolant pump 14 and the radiator 13 in series. The coolant is pumped by the coolant pump 14 to be circulated through the cooling system. After flowing out of the coolant passage 1g in the fuel cell stack 1, coolant flows through the coolant passage 12 to the radiator 13 where the coolant exchanges heat with the atmosphere.

Figure 2:
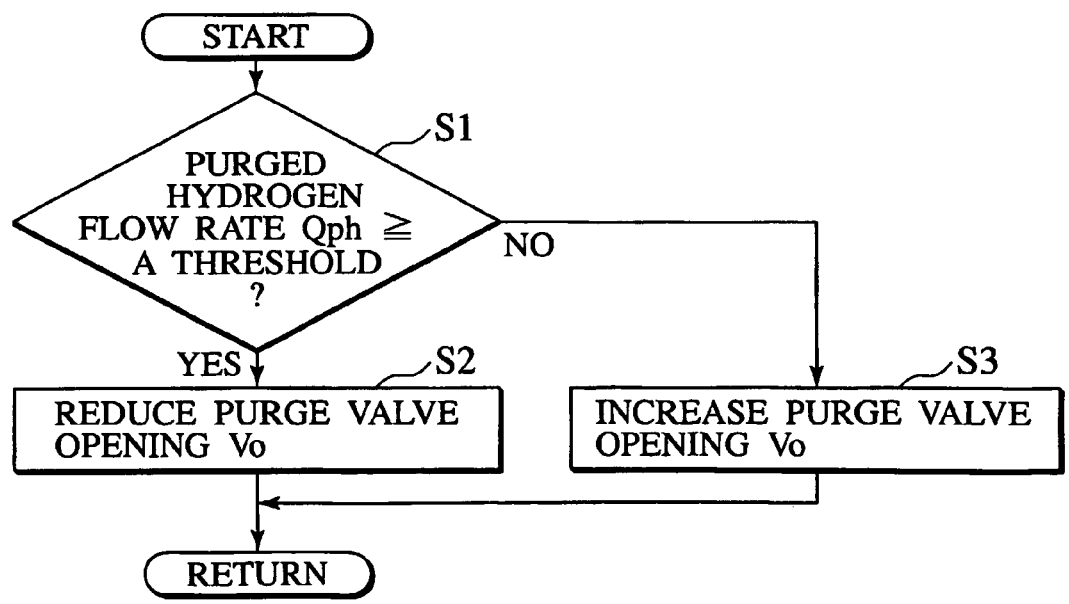
FIG. 2 is a flowchart showing control of the fuel cell system of FIG. 1.

Next, the valve opening control to adjust the valve opening degree Vo of the purge valve 8 by the controller 100 in the first embodiment will be described with reference to the flowchart of FIG. 2.

In Step S1, it is determined at a predetermined point of time whether or not the purged hydrogen flow rate Qph, that is a flow rate of the hydrogen in the nitrogen containing fuel gas which is discharged outside of the system from the purge valve 8, is equal to or more than a predetermined threshold Qph0, or within or more than a threshold band having a certain range. A calculation method for the flow rate of the hydrogen Qph will be described later. If the purged hydrogen flow rate Qph is equal to or more than the threshold Qph0, or within or more than the threshold band, the control process proceeds to step S2. If the purged hydrogen flow rate Qph is less than the threshold Qph0 or the threshold band, the process proceeds to step S3. In Step S2, the valve opening degree Vo of the purge valve 8 is decreased so as to reduce a discharge amount Qpt of the fuel gas. On the other hand, in Step S3, the valve opening degree Vo of the purge valve 8 is increased so as to increase the discharge amount Qpt of the fuel gas.

Figure 3:
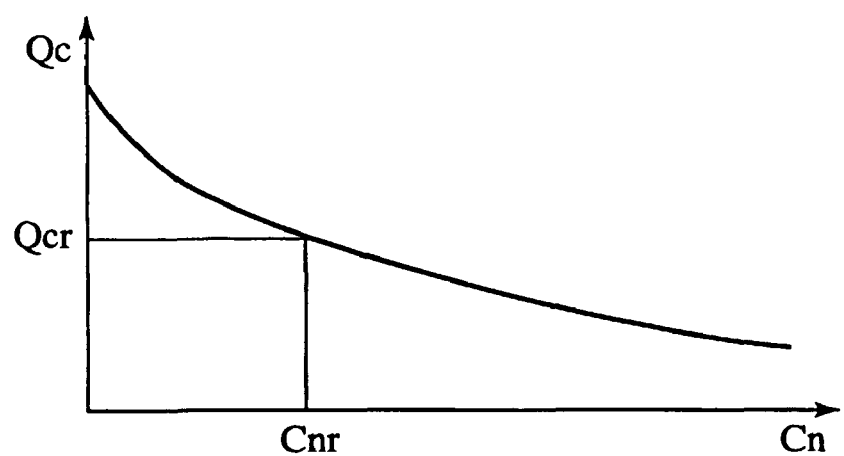
FIG. 3 is a graph showing a relation between a nitrogen concentration Cn in a fuel recirculation system and an ejector-circulating hydrogen flow rate Qc under a condition where temperature and pressure of fuel gas are kept constant.

FIG. 3 shows a relation between a nitrogen concentration Cn in the fuel recirculation system Rc and an ejector-circulating hydrogen flow rate Qc, that is, a flow rate of the hydrogen of the fuel gas circulating through the ejector 6, in the first embodiment under a condition where the fuel gas temperature Th2 and fuel gas pressure Ph2 are kept constant. As shown in FIG. 3, when the nitrogen concentration Cn in the fuel recirculation system Rc increases and a hydrogen partial pressure of the fuel gas in the system Rc decreases, the ejector-circulating hydrogen flow rate Qc is lowered. This necessitates opening the purge valve 8 for purging nitrogen in the system to lower the nitrogen concentration Cn in the fuel recirculation system Rc.

Assuming Qcr is the minimum ejector-circulating hydrogen flow rate required for steady operation of the fuel cell stack 1, the nitrogen concentration Cn in the fuel recirculation system Rc needs to be controlled to be Cn or less, so that the ejector-circulating hydrogen flow rate Qc does not fall below Qcr. However, when the purge valve 8 is opened for purging nitrogen in the fuel recirculation system Rc so as to lower the nitrogen concentration Cn in the fuel gas therein, the hydrogen in the fuel gas is also discharged, adversely affecting the performance of the fuel cell system S.

To avoid this problem, it is necessary, to some extent, to decrease the hydrogen concentration in the fuel gas of the fuel recirculation system Rc and to increase the nitrogen concentration Cn therein. The control of the purge valve 8 for proper adjustment of the valve opening degree Vo thereof provides nitrogen concentration Cn in the fuel recirculation system Rc stably maintained at Cn and the purged hydrogen flow rate Qph is kept to the requisite minimum.

Figure 4:
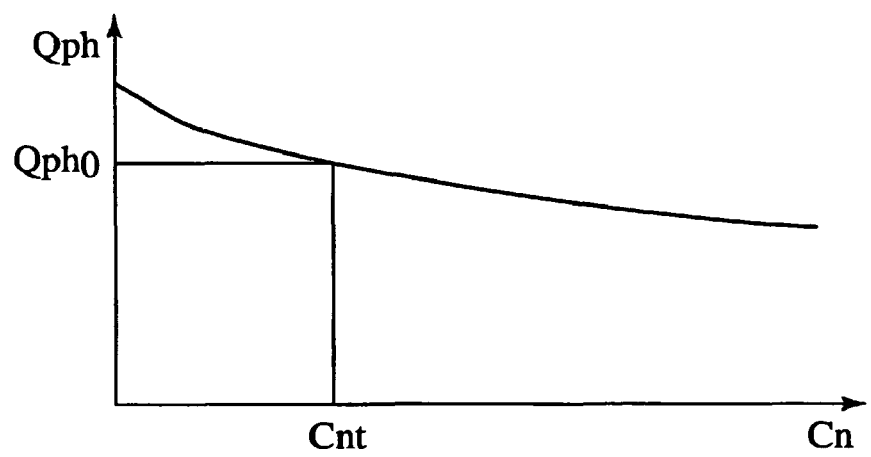
FIG. 4 is a graph showing a relation between the nitrogen concentration Cn in the fuel recirculation system and a purged hydrogen flow rate Qph under a condition where the temperature and pressure of the fuel gas and a valve opening degree of the purge valve 8 are kept constant.

FIG. 4 shows a relation between the nitrogen concentration Cn in the fuel recirculation system Rc and the purged hydrogen flow rate Qph through the purge valve 8 in the first embodiment under a condition where the valve opening degree Vo of the purge valve 8 and the fuel gas temperature Th2 and fuel gas pressure Ph2 are kept constant. It is understood that, under this condition, as the nitrogen concentration Cn decreases in the system Rc, the purged hydrogen flow rate Qph increases due to the increased hydrogen partial pressure in the fuel gas. In this case, by controlling the purge valve 8 to adjust the valve opening degree Vo thereof as shown in the flowchart of FIG. 2, the purged hydrogen flow rate Qph can be maintained at the threshold Qph0 and the nitrogen concentration Cn in the fuel recirculation system Rc can be kept constant. Thus, the amount of the hydrogen discharged outside of the system can be restricted to the minimum.

Figure 5:
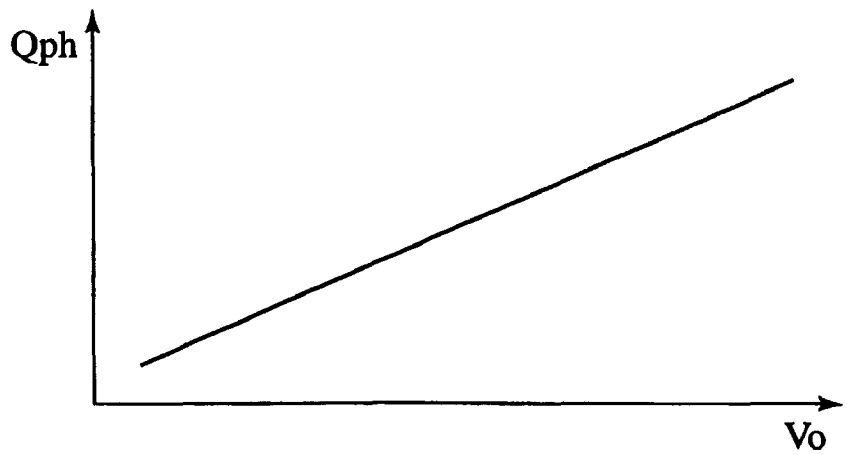
FIG. 5 is a graph showing a relation between the valve opening degree Vo of the purge valve 8 and the purged hydrogen flow rate Qph under a condition where the temperature and pressure of the fuel gas and the nitrogen concentration in the fuel recirculation system are kept constant.

FIG. 5 shows a relation between the valve opening degree Vo of the purge valve 8 and the purged hydrogen flow rate Qph in the first embodiment under a condition where the fuel gas temperature Th2 and fuel gas pressure Ph2 and the nitrogen concentration Cn in the fuel recirculation system Rc are kept constant. As shown in FIG. 5, under this condition, the purged hydrogen flow rate Qph tends to increase as the valve opening degree Vo of the purge valve 8 increases. Specifically, there is a tendency that under the constant nitrogen concentration condition, the purged hydrogen flow rate Qph increases as the valve opening degree Vo of the purge valve 8 increases. Accordingly, if the purge valve 8 has a valve opening degree Vo variable in a wide range with a relatively high upper limit, correction is made to set the threshold Qph0 in Step S1 of the flowchart of FIG. 2 at a relatively higher value, thus making it possible to maintain the nitrogen concentration Cn at a constant level in the fuel recirculation system Rc.

Figure 6:
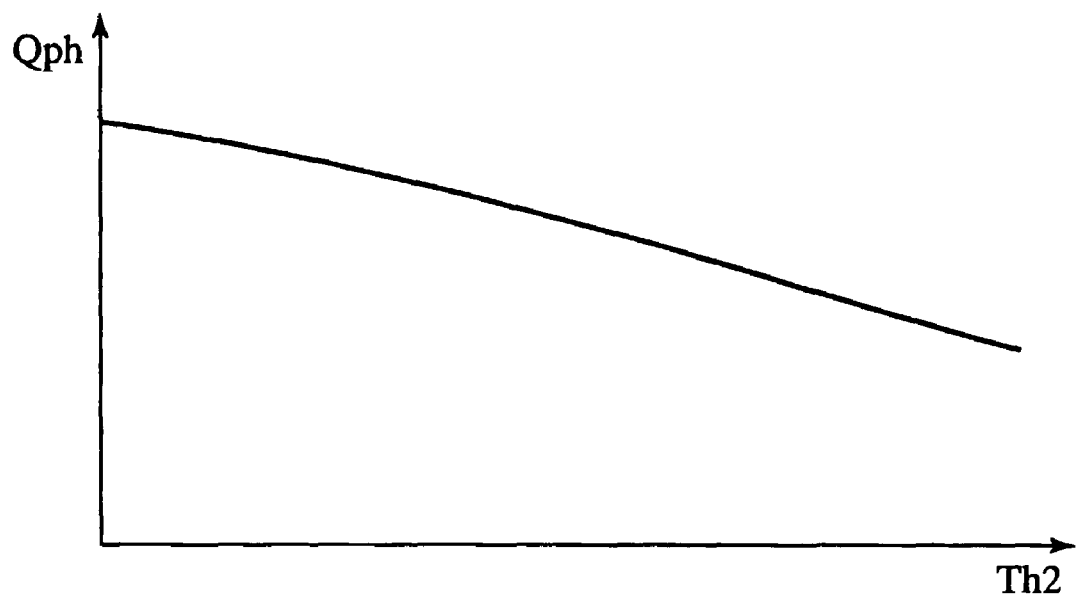
FIG. 6 is a graph showing a relation between a fuel gas temperature Th2 and the purged hydrogen flow rate Qph under a condition where the nitrogen concentration in the fuel recirculation system, the pressure of the fuel gas and the valve opening degree of the purge valve 8 are kept constant.

FIG. 6 shows a relation between fuel gas temperature Th2 downstream the fuel cell stack 1 (or the purge valve inlet temperature detected by the temperature sensor 21) and the purged hydrogen flow rate Qph in the first embodiment under a condition where the nitrogen concentration Cn in the fuel recirculation system Rc, the fuel gas pressure Ph and the valve opening degree Vo of the purge valve 8 are kept constant. Since the fuel cell stack 1 is a stack of polymer electrolyte fuel cells, the fuel gas in the fuel recirculation system Rc is saturated or nearly saturated with water vapor downstream of the fuel cell stack 1 near the purge valve 8. Since the saturated vapor pressure of the fuel gas is elevated as the fuel gas temperature Th2 rises, the fuel gas can contain more molecules of water vapor, whereby the average molecular weight thereof is increased. Accordingly, the hydrogen partial pressure in the fuel gas is lowered, and the purged hydrogen flow rate Qph is decreased as shown in FIG. 6.

In other words, under the constant nitrogen concentration condition, the purged hydrogen flow rate Qph tends to decrease due to the rise of the fuel gas temperature Th2. Therefore, if the fuel gas temperature Th2 is relatively high, correction is made to set the threshold Qph0 in Step S1 of FIG. 2 at a relatively lower value, thus making it possible to maintain the nitrogen concentration Cn at a constant level in the fuel recirculation system Rc no matter how much the fuel gas temperature Th2 may vary.

Figure 7:
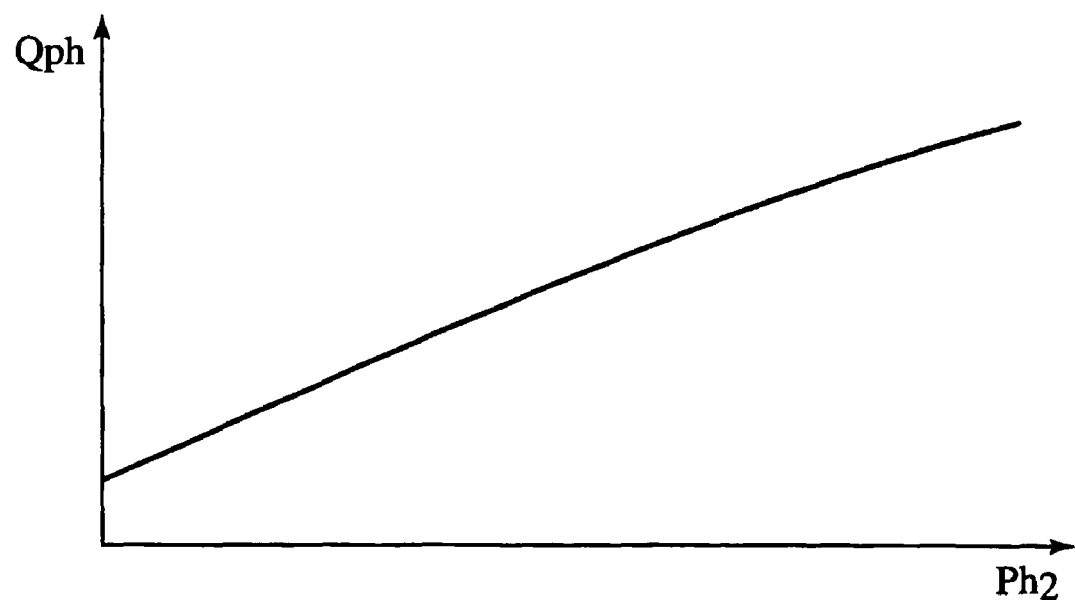
FIG. 7 is a graph showing a relation between an inlet hydrogen pressure Ph2 and the purged hydrogen flow rate Qph under a condition where the nitrogen concentration in the fuel recirculation system, the temperature of the fuel gas and the valve opening degree of the purge valve 8 are kept constant.

FIG. 7 shows a relation between the purged hydrogen flow rate Qph and the fuel gas supply pressure Ph2 to the fuel cell stack 1 in the first embodiment under a condition where the nitrogen concentration Cn, the fuel gas temperature Th2 and the valve opening degree Vo of the purge valve 8 are kept constant. As shown in FIG. 7, under this condition, the purged hydrogen flow rate Qph tends to decrease as the fuel gas supply pressure Ph2 is lowered. Specifically, there is a tendency that under the constant nitrogen concentration condition, the purged hydrogen flow rate Qph decreases as the fuel gas supply pressure Ph2 decreases. Accordingly, if the fuel gas supply pressure Ph2 is relatively low, correction is made to set the threshold Qph0 in Step S1 of FIG. 2 at relatively low value, thus making it possible to maintain the nitrogen concentration Cn at a constant level in the fuel recirculation system Rc no matter how much the fuel gas pressure Ph2 may vary.

Next, a calculation method for the purged hydrogen flow rate Qph will be described. Note that the purged hydrogen flow rate Qph is the remainder obtained from a formula Qph=Qih−Qeh, wherein Qih is a flow rate of the hydrogen supplied to the fuel cell system S and Qeh is a flow rate of hydrogen to be consumed without being purged.

First, a method for obtaining the flow rate Qih of the hydrogen supplied to the fuel cell system S will be described.

In general, the flow rate of the hydrogen passing through the regulator 3 can be calculated from the pressure and temperature of the fuel gas upstream of the regulator 3, when the regulator 3 is in a choked state where the valve opening degree thereof is small. And when the regulator 3 is in an unchoked state, the flow rate can be calculated from the pressures of the fuel gas upstream and downstream of the regulator 3 and the temperature of the fuel gas upstream thereof. In this first embodiment, the ejector 6 has a choking nozzle inside thereof for a fuel gas supply system Sc which is from the fuel tank 2 through the regulator 3 to the ejector 6.

Therefore, the supplied hydrogen flow rate Qih can be calculated by use of the ejector inlet pressure Ph1 and ejector outlet pressure (or fuel gas supply pressure to the stack) Ph2 which have been detected by the pressure sensors 20 and 4 provided upstream and downstream of the ejector 6, respectively.

In the case where the temperature of the supplied fuel gas varies in a wide range, the supplied hydrogen flow rate Qih can be calculated more precisely by making a correction for the fuel gas temperature Th1 which is detected by the temperature sensor 22 provided in the fuel gas supply system Sc.

Next, a method for obtaining the flow rate of hydrogen to be consumed without being purged Qeh will be described.

The rate of hydrogen consumption in the fuel cell stack 1 is proportional to an output current I of the fuel cell stack 1, which can be detected by an ammeter 26 provided in an electrical circuit 25. Therefore, the flow rate of hydrogen to be consumed without being purged Qeh can be calculated from the detected output current I.

As described above, in the first embodiment, the valve opening degree Vo of the purge valve 8, the fuel gas pressures Ph1 and Ph2, and the fuel gas temperatures Th1 and Th2 are detected by the respective sensors 8a, 20, 4, 22 and 21. These detected values give a purged hydrogen flow rate Qph for a target value Cot of the nitrogen concentration Cn in the fuel recirculation system Rc, which is set as a threshold Qph0 to be compared with purged hydrogen flow rates Qph to be detected at regular time intervals. Here, the purged hydrogen flow rate Oph has tendencies as shown in FIGS. 5 to 7 with respect to the variations of the valve opening degree Vo of the purge valve 8 and the fuel gas pressure Ph2 and the fuel gas temperature Th2. Therefore, the larger the valve opening degree Vo of the purge valve 8 is, the higher the threshold Qph0 is set, and the higher the fuel gas temperature Th2 is and the lower the fuel gas pressure Ph2 is, the lower the threshold Qph0 is set.

According to the first embodiment, the nitrogen concentration Cn in the fuel recirculation system Rc is controlled to be constant. Accordingly, excessive purge of nitrogen in which hydrogen is wastefully discharged together with the purged nitrogen, is prevented, thus contributing the stabilized power generation of the fuel cell system S.

Moreover, the hydrogen flow rate Qph discharged through the purge valve 8 is controlled to be the threshold Qph0 which is determined based on the operation conditions and the valve opening degree Vo of the purge valve 8. Thus, without using any nitrogen concentration sensor, the nitrogen concentration Cn in the fuel recirculation system Rc can be controlled to a constant level. The hydrogen discharge is suppressed, thus enhancing operation efficiency of the fuel cell system S.

In addition, the larger the valve opening degree Vo of the purge valve 8 is, the higher the threshold Qph0 for adjustment of the valve opening degree Vo thereof is set, whereby the amount of the hydrogen discharged can be suppressed, even if the valve opening degree Vo of the purge valve 8 is varied in a wide range, thus enhancing operation efficiency of the fuel cell system S.

Furthermore, the temperature sensor 21 is provided to detect the temperature Th2 of the fuel gas passing through the purge valve 8. And the higher the fuel gas temperature Th2 is, the lower the threshold Qph0 for adjustment of the valve opening degree Vo thereof is set. The amount of hydrogen discharged is thus suppressed even if the fuel gas temperature Th2 varies, thus enhancing operation efficiency of the fuel cell system S.

Furthermore, the pressure sensor 4 is provided to detect the fuel gas supply pressure Ph2. And the lower the fuel gas supply pressure Ph2 is, the lower the threshold Qph0 is set.

The amount of the hydrogen discharged is thus suppressed no matter how much the fuel gas pressure may vary, thus enhancing operation efficiency of the fuel cell system S.

Still further, the flow rate of the hydrogen passing through the purge valve 8, that is the purged hydrogen flow rate Qph, is calculated as the difference between Qih, that is the flow rate of hydrogen supplied to the fuel cell system S, and Qeh, that is the flow rate of hydrogen to be consumed without being purged. This eliminates the necessity to provide a flow meter for the flow rate of the purged fuel gas, and instead the accurate purged hydrogen flow rate Qph is obtained by the usual pressure sensors 4 and 20 and temperature sensor 22, whereby cost is saved.

Still further, the supplied hydrogen flow rate Qih to the fuel cell system S is calculated from the ejector inlet pressure Phl and the ejector outlet pressure Ph2. This eliminates the necessity to provide a flow meter for the flow rate of the supplied hydrogen, whereby cost is saved.

Since the supplied hydrogen flow rate Qih is corrected based on the fuel gas temperature Th1 upstream of the ejector 6, the calculated supplied hydrogen flow rate Qih has improved accuracy.

Moreover, the accurate consumed hydrogen flow rate Qeh excluding the purge is obtained by the calculation based on the output current I of the fuel cell stack 1, which has been detected by an ordinary ammeter 26, whereby cost is saved.

Figure 8:
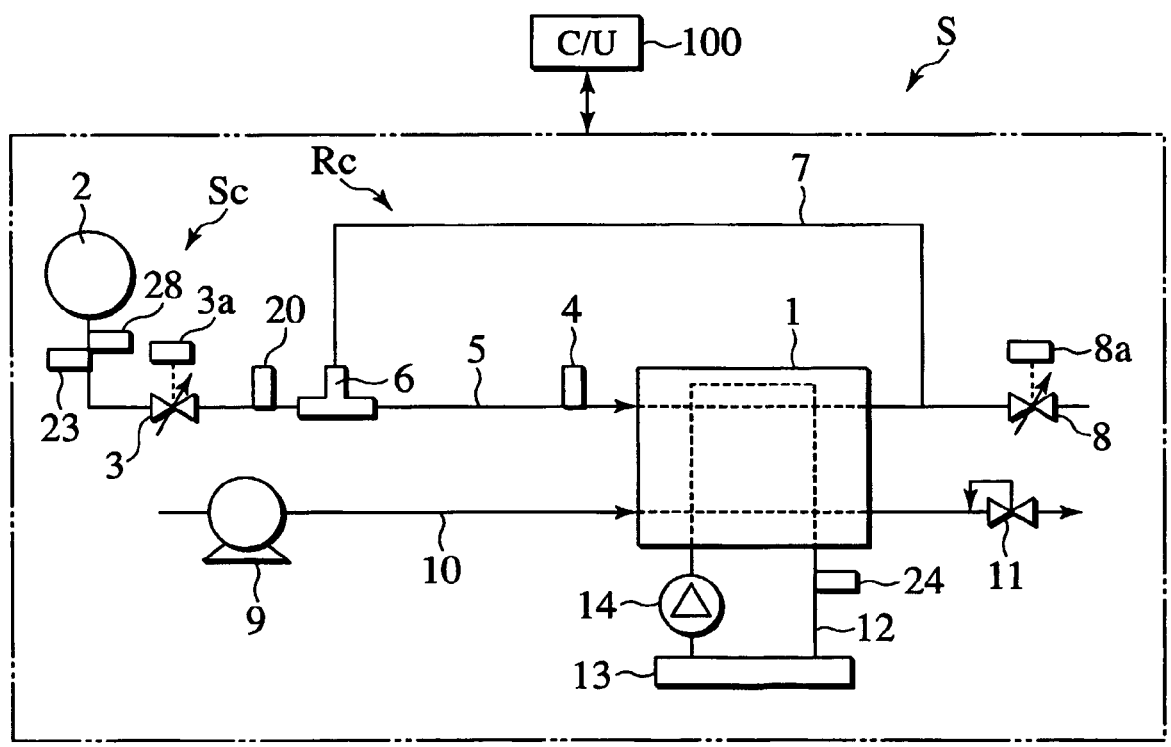
FIG. 8 is a system diagram illustrating a configuration of a fuel cell system according to a second embodiment of the present invention.

FIG. 8 is a diagram illustrating a configuration of a fuel cell system S according to a second embodiment of the present invention. The fuel cell system S of the second embodiment is different from that of the first embodiment shown in FIG. 1, in which a pressure sensor 23 is provided to detect pressure of the fuel gas upstream of the regulator 3. The supplied hydrogen flow rate Qih is calculated by use of a regulator inlet pressure Ph3 and regulator outlet pressure (or the ejector inlet pressure) Ph2, which have been detected by the pressure sensors 23 and 20 provided upstream and downstream of the regulator 3, respectively. In FIG. 8, elements denoted by the same reference numerals as those in FIG. 1 have the same functions.

In this embodiment, given a valve opening degree Vr of the regulator 3 which is detected by the controller 100 controlling the opening/closing of the regulator 3, the supplied hydrogen flow rate Qih can be calculated based on the valve opening degree Vr thereof and the regulator inlet pressure Ph3 and regulator outlet pressure Ph2 similarly to the case of obtaining the same flow rate Qih from the ejector inlet pressure Phl and outlet pressure Ph2.

The supplied hydrogen flow rate Qih is calculated only from the regulator inlet pressure Ph3 when the valve opening degree Vr of the regulator 3 is small enough for the regulator 3 to be in a choked state. When the regulator inlet pressure Ph3 is in an unchoked state, the supplied hydrogen flow rate Qih is calculated from the regulator inlet pressure Ph3 and the regulator outlet pressure Ph2. In the second embodiment, a temperature sensor 24 provided in the coolant passage 12 of the fuel cell stack 1 to detect a coolant temperature Tw. Since the fuel gas and the coolant exchange heat in the fuel cell stack 1, the coolant temperature Tw and the fuel gas temperature Th2 are approximately equal to each other, and it is possible to use the coolant temperature Tw as the fuel gas temperature estimate the fuel gas temperature from. Moreover, the coolant is in the form of liquid, which provides better responsiveness for temperature measurement than gas. Even if the coolant temperature Tw varies due to the rapidly changing load on the fuel cell system S, the coolant still provides more accurate temperature measurement than a fuel gas.

Similarly to the first embodiment, a temperature sensor 28 is provided in the fuel gas supply system Sc upstream of the regulator 3 to detect fuel gas temperature Th3 thereat. For varying temperature Th3 of the supplied fuel gas, correction can be made for more accurate supplied hydrogen flow rate Qih based on the detected fuel gas temperature Th3.

According to the second embodiment, the flow rate Qih of hydrogen supplied to the fuel cell system S is calculated based on the valve opening degree Vr of the regulator 3 which is provided in the fuel gas supply system Sc thereof, the regulator inlet pressure Ph3 and regulator outlet pressure Ph2. Thus, without using the flow rate sensor for detecting the flow rate of the fuel gas, the amount of the hydrogen discharged is suppressed, thus enhancing operation efficiency of the fuel cell system S. Moreover, correction based on the fuel gas temperature Th3 provides a more accurate flow rate of the supplied hydrogen Qih.

Next, a third embodiment of the present invention will be described.

The third embodiment is different from the first or second embodiment in that an improvement is made for the calculation of Qe which is the rate of hydrogen consumption by the electrical power generation of the fuel cell stack 1. As described above, Qeh that is the flow rate of hydrogen to be consumed without being purged is calculated based on Qe. Other elements are the same as those of the first or second embodiment.

A fuel cell system S for a vehicle is required to cope with the rapidly changing load on the system S and to be capable of adjusting the output of the fuel cell stack 1 depending on the changing load. For variable output thereof, the pressure Ph2 of the fuel gas supplied to the fuel cell stack 1 is controlled. In order to increase the supply pressure of the fuel gas, it is necessary to supply hydrogen to the fuel recirculation system Rc at a rate more than Qeh that is calculated from the rate of hydrogen consumption Qe by the electrical power generation of the fuel cell stack 1. On the other hand, in order to decrease the supply pressure of the fuel gas, a rate of hydrogen supplied to the system Rc is reduced to less than Qeh. In the case of taking only the rate of hydrogen consumption Qe by the electrical power generation of the fuel cell stack 1 into consideration, it is impossible to calculate accurately the purged hydrogen flow rate Qph in a time of transition while the fuel gas pressure Ph2 is being increased or decreased.

Here, while Qih that is the flow rate of hydrogen supplied to the fuel recirculation system Rc is being changed in order to increase and decrease the fuel gas pressure Ph2 in the system Rc, a difference between the supplied hydrogen flow rate Qih and the rate of hydrogen consumption Qe by the electrical power generation of the fuel cell stack 1 is proportional to a pressure variation rate or pressure difference DP of the changing fuel gas pressure Ph2, that is a difference between a target fuel gas pressure determined based on a required output of the fuel cell stack 1 and a fuel gas pressure at present. Specifically, the supplied hydrogen flow rate Qih is represented by:

$$Qih = Qe + C \times DP$$

where C is a constant to be determined depending on a capacity of the fuel recirculation system Rc of the fuel cell system S. The fuel gas pressure Ph2 is detected by the pressure sensor 4 of FIGS. 1 and 7. Therefore, by provision of a unit for obtaining the pressure difference DP of the fuel gas pressure Ph2 in the controller 100, the supplied hydrogen flow rate Qih in a time of transition when the fuel gas pressure Ph2 is being changed can be calculated based on the pressure difference DP.

According to the third embodiment, the supplied hydrogen flow rate Qih can be calculated accurately even if the fuel gas pressure Ph2 is being changed. Thus, the purged hydrogen flow rate Qph can be calculated more accurately, contributing to precise control of the nitrogen concentration Cn in the fuel recirculation system Rc.

Although the ejector 6 is used for circulating the fuel gas in the first to third embodiments, the present invention can be applied even if the fuel gas is circulated by use of, for example, a pump or a blower.

Even in the case of using the pump or the blower, similarly to the case of using the ejector 6, an increase of the nitrogen concentration Cn in the hydrogen circulation system Rc results in a drop of the hydrogen partial pressure therein, which necessitates an increase of the supplied hydrogen flow rate Qih. Even in such a case, similarly to the second embodiment, adjustment of the supplied hydrogen flow rate Qih is made by calculation based on the valve opening degree Vr of the regulator 3, the regulator inlet pressure Ph3 and the regulator outlet pressure Ph2, which gives the optimum timing to close the purge valve 8.

Moreover, the sensors for detecting the fuel gas pressure may be provided not upstream of the fuel cell stack 1 but downstream thereof Especially for the case that a pressure loss of the fuel gas of the fuel cell stack 1 is large, detection of the fuel gas pressure upstream of the stack 1 provides more precise control.

In addition, the fuel gas to be used in the system is not limited to the hydrogen gas supplied from the fuel tank 2, but may be one generated by a reformer.

The present disclosure relates to subject matter contained in Japanese Patent Application No. 2002-351274, filed on Dec. 3, 2002, the disclosure of which is expressly incorporated herein by reference in its entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

According to the present invention, the fuel cell system S has a system Rc for recirculating the fuel gas, in which the purge valve 8 for purging nitrogen transported into the system Rc due to diffusion is provided to discharge the fuel gas together with the nitrogen. The purge valve 8 is controlled to have the valve opening degree thereof adjusted so that the nitrogen concentration in the system Rc is kept constant, thus suppressing the amount of hydrogen discharged out of the system together with the fuel gas to thereby enhance performance of the fuel cell system S.

The invention claimed is:

1. A fuel cell system comprising:
    a fuel cell configured to generate power from fuel gas supplied thereto;
    a supply system configured to supply fuel gas to the fuel cell;
    a recirculation system configured to recirculate unused fuel gas from the fuel cell, wherein fuel gas in the recirculation system contains nitrogen;
    a purge valve configured to purge nitrogen contained in the fuel gas in the recirculation system, wherein the purge valve is configured such that a valve opening degree of the purge valve is controlled to be reduced or increased; and
    a controller configured to adjust the valve opening degree of the purge valve such that a nitrogen concentration of the fuel gas in the recirculation system is controlled to be maintained at a target nitrogen concentration,
    wherein the controller is configured to:
    adjust the valve opening degree of the purge valve to maintain a flow rate of fuel in a fuel gas passing through the purge valve at a threshold set in accordance with operation conditions of the fuel cell system and the valve opening degree of the purge valve, by reducing the valve opening degree of the purge valve if the flow rate of fuel in the fuel gas passing through the purge valve is more than the threshold, and increasing the valve opening degree of the purge valve if the flow rate of the fuel gas passing through the purge valve is less than the threshold.

2. The fuel cell system according to claim 1, wherein the threshold is set larger as the valve opening degree of the purge valve becomes larger.

3. The fuel cell system according to claim 1, further comprising:
    a temperature sensor configured to detect a temperature of the fuel gas passing through the purge valve, wherein the threshold is set lower as the temperature of the fuel gas detected by the temperature sensor rises.

4. The fuel cell system according to claim 1, further comprising:
    a pressure sensor configured to detect a pressure of fuel gas in the supply system, wherein the threshold is set lower as the pressure of the fuel gas detected by the pressure sensor drops.

5. The fuel cell system according to claim 1, wherein the flow rate of fuel in the fuel gas passing through the purge valve is obtained from a difference between a supply rate of fuel supplied from the supply system and a consumption rate of fuel gas consumed by the fuel cell.

6. The fuel cell system according to claim 5, further comprising:
    an ejector provided in the recirculation system, to which the supply system is connected; and
    a pressure sensor configured to detect a supply pressure of fuel gas supplied to the ejector,
    wherein the supply rate of fuel supplied from the supply system is calculated based on the supply pressure detected by the pressure sensor.

7. The fuel cell system according to claim 6, further comprising:
    a temperature sensor configured to detect a temperature of fuel gas upstream of the ejector, wherein the supply rate of fuel is calculated based on the temperature of the fuel gas detected by the temperature sensor and the supply pressure thereof detected by the pressure sensor.

8. The fuel cell system according to claim 5, further comprising:
    a fuel pressure regulator for the fuel gas supplied to the fuel cell;
    a valve opening sensor configured to detect a valve opening of the fuel pressure regulator; and
    a pressure sensor configured to detect pressure of fuel gas upstream of the fuel pressure regulator, wherein the supply rate of fuel is calculated based on the valve opening of the fuel pressure regulator detected by the valve opening sensor, and the pressure of the fuel gas upstream of the fuel pressure regulator detected by the pressure sensor.

9. The fuel cell system according to claim 8, further comprising:

a temperature sensor configured to detect a temperature of the fuel gas upstream of the fuel pressure regulator, wherein the supply rate of fuel is calculated based on a valve opening degree of the fuel pressure regulator detected by the valve opening sensor, the pressure of the fuel gas upstream of the fuel pressure regulator detected by the pressure sensor, and the temperature of the fuel gas detected by the temperature sensor.

10. The fuel cell system according to claim 5, further comprising:
an ammeter configured to detect an output current of the fuel cell, wherein the consumption rate of fuel is calculated based on the output current detected by the ammeter.

11. The fuel cell system according to claim 5, further comprising:
an ammeter configured to detect an output current of the fuel cell; and
a pressure sensor configured to detect a pressure of fuel gas upstream or downstream of the fuel cell, wherein the controller is provided with a unit for obtaining a variation rate of the pressure of the fuel gas detected by the pressure sensor, and wherein the consumption rate of fuel is calculated based on the output current detected by the ammeter and the variation rate of the pressure of the fuel gas given by the unit of the controller.

12. A fuel cell system comprising:
a fuel cell configured to generate power from fuel gas supplied thereto;
a supply system configured to supply fuel gas to the fuel cell;
a recirculation system configured to recirculate unused fuel gas from the fuel cell, wherein fuel gas in the recirculation system contains nitrogen;
a purge valve configured to purge nitrogen contained in the fuel gas in the recirculation system, wherein the purge valve is configured such that a valve opening degree of the purge valve is controlled to be reduced or increased; and
a controller configured to adjust the valve opening degree of the purge valve such that a nitrogen concentration of the fuel gas in the recirculation system is controlled to be maintained at a target nitrogen concentration.

13. The fuel cell system according to claim 12, wherein the controller is configured to:
reduce the valve opening degree of the purge valve if the flow rate of fuel in the fuel gas passing through the purge valve is more than a threshold set in accordance with operating conditions of the fuel cell system and the valve opening degree of the purge valve, and increase the valve opening degree of the purge valve if the flow rate of the fuel gas passing through the purge valve is less than the threshold.

14. The fuel cell system according to claim 13, wherein the threshold is set larger as the valve opening degree of the purge valve becomes larger.

15. The fuel cell system according to claim 13, further comprising:
a temperature sensor configured to detect a temperature of the fuel gas passing through the purge valve, wherein the threshold is set lower as the temperature of the fuel gas detected by the temperature sensor rises.

16. The fuel cell system according to claim 13, further comprising:
a pressure sensor configured to detect a pressure of fuel gas in the supply system, wherein the threshold is set lower as the pressure of the fuel gas detected by the pressure sensor drops.

17. The fuel cell system according to claim 12, wherein the flow rate of fuel in the fuel gas passing through the purge valve is obtained from a difference between a supply rate of fuel supplied from the supply system and a consumption rate of fuel gas consumed by the fuel cell.

18. The fuel cell system according to claim 17, further comprising:
an ejector provided in the recirculation system, to which the supply system is connected; and
a pressure sensor configured to detect a supply pressure of fuel gas supplied to the ejector, wherein the supply rate of fuel supplied from the supply system is calculated based on the supply pressure detected by the pressure sensor.

19. The fuel cell system according to claim 18, further comprising:
a temperature sensor configured to detect a temperature of fuel gas upstream of the ejector, wherein the supply rate of fuel is calculated based on the temperature of the fuel gas detected by the temperature sensor and the supply pressure thereof detected by the pressure sensor.

20. The fuel cell system according to claim 17, further comprising:
a fuel pressure regulator for the fuel gas supplied to the fuel cell;
a valve opening sensor configured to detect a valve opening of the fuel pressure regulator; and
a pressure sensor configured to detect a pressure of fuel gas upstream of the fuel pressure regulator, wherein the supply rate of fuel is calculated based on the valve opening of the fuel pressure regulator detected by the valve opening sensor, and the pressure of the fuel gas upstream of the fuel pressure regulator detected by the pressure sensor.

21. The fuel cell system according to claim 20, further comprising:
a temperature sensor configured to detect a temperature of the fuel gas upstream of the fuel pressure regulator, wherein the supply rate of fuel is calculated based on a valve opening degree of the fuel pressure regulator detected by the valve opening sensor, the pressure of the fuel gas upstream of the fuel pressure regulator detected by the pressure sensor, and the temperature of the fuel gas detected by the temperature sensor.

22. The fuel cell system according to claim 17, further comprising:
an ammeter configured to detect an output current of the fuel cell, wherein the consumption rate of fuel is calculated based on the output current detected by the ammeter.

23. The fuel cell system according to claim 17, further comprising:
an ammeter configured to detect an output current of the fuel cell; and
a pressure sensor configured to detect a pressure of fuel gas upstream or downstream of the fuel cell, wherein the controller is provided with a unit for obtaining a variation rate of the pressure of the fuel gas detected by the pressure sensor, and wherein the consumption rate of fuel is calculated based on the output current detected by the ammeter and the variation rate of the pressure of the fuel gas given by the unit of the controller.

* * * * *